United States Patent [19]
Nelson

[11] 4,157,745
[45] Jun. 12, 1979

[54] PARK-LOCK MECHANISM FOR A VEHICLE TRANSMISSION

[75] Inventor: Carl D. Nelson, Ennis, Tex.
[73] Assignee: J. I. Case Company, Racine, Wis.
[21] Appl. No.: 908,128
[22] Filed: May 22, 1978
[51] Int. Cl.² ............................................. B60T 1/06
[52] U.S. Cl. ...................................... 188/31; 188/69; 188/82.3
[58] Field of Search .................... 188/31, 60, 69, 82.3, 188/82.77; 192/4 A

[56] References Cited
U.S. PATENT DOCUMENTS

| | | | |
|---|---|---|---|
| 1,387,156 | 8/1921 | Igo et al. ............................ | 188/31 X |
| 2,631,466 | 3/1953 | Deveson ............................ | 188/69 X |
| 2,996,154 | 8/1961 | Vial ..................................... | 188/69 |

Primary Examiner—Duane A. Reger
Attorney, Agent, or Firm—Arthur J. Hansmann

[57] ABSTRACT

A park-lock mechanism for a vehicle transmission having a rotatable gear held against rotation by a pawl movable in two directions and being free of a pivot mounting. The pawl has arcuate surfaces which are contacted by a control member, for moving the pawl in a direction radially of the gear, and there is a sliding support for the pawl and a tension spring for positioning the pawl relative to the gear. The force of rotation of the gear itself is transmitted to the pawl, after initial release of the pawl by the control member, and thus further force on the control member is only a minimal amount since the force from the gear assists the movement of the control member after that initial control member movement.

11 Claims, 2 Drawing Figures

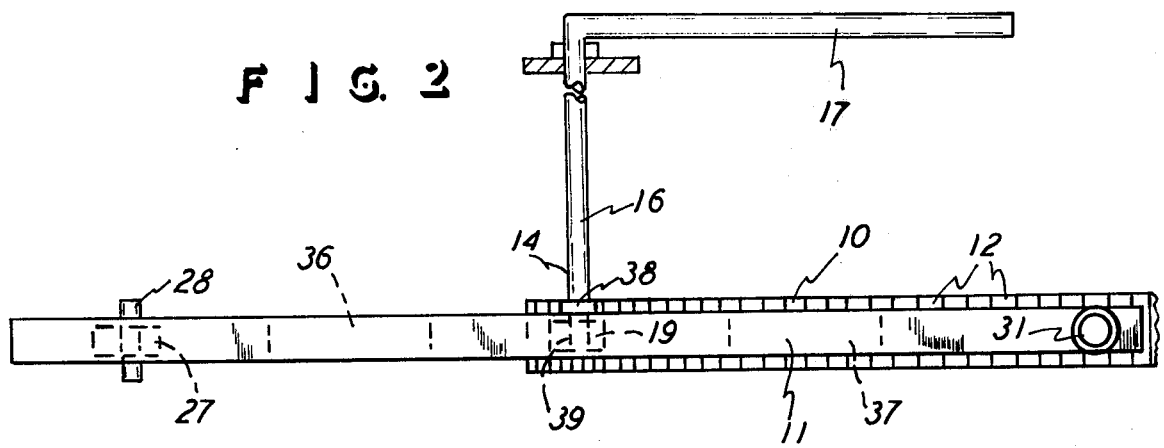
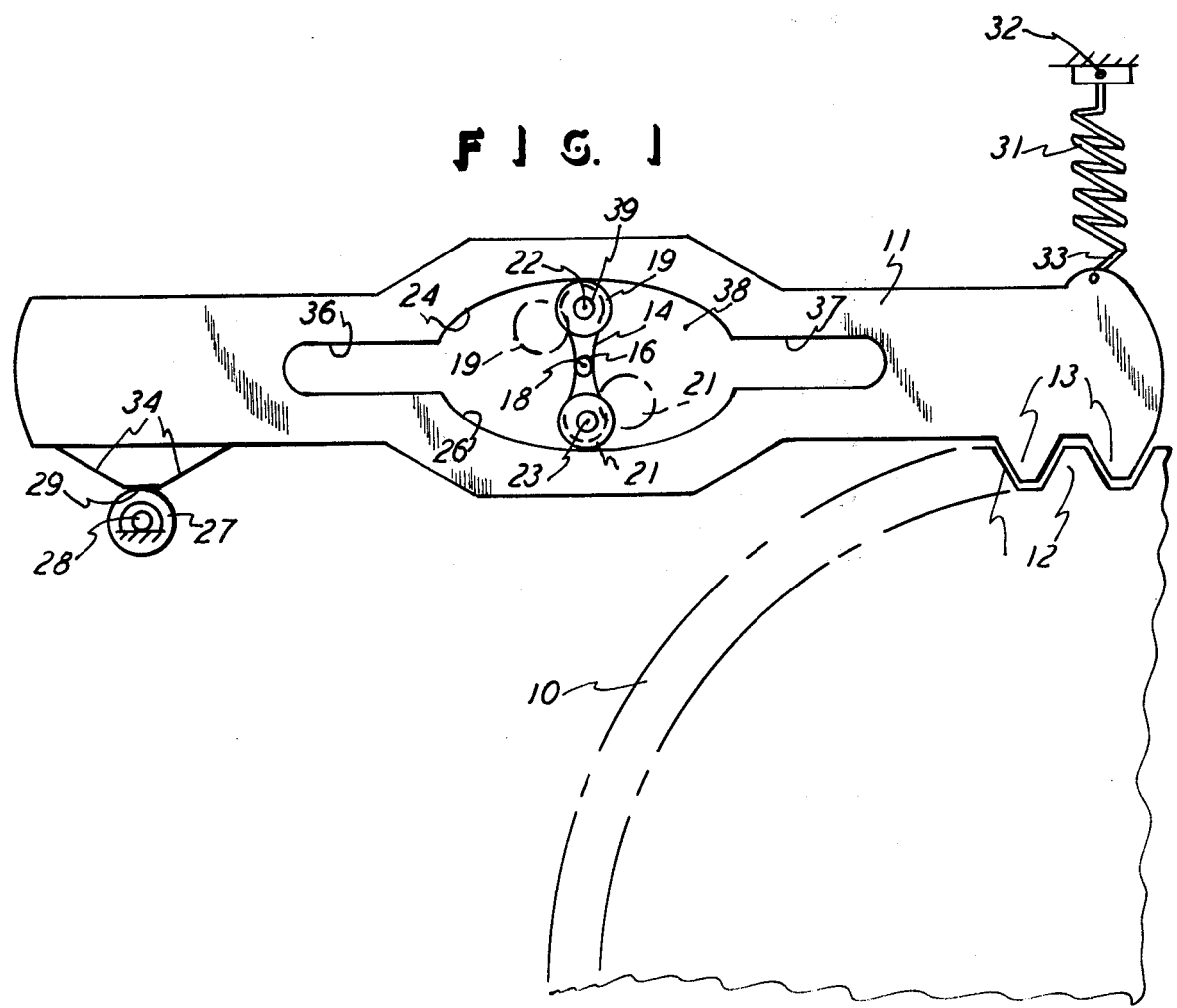

PARK-LOCK MECHANISM FOR A VEHICLE TRANSMISSION

This invention relates to a park-lock mechanism for a vehicle transmission, and, more particularly, it relates to a vehicle park-lock of the type which utilizes a pawl for engaging the teeth of the vehicle transmission park gear.

BACKGROUND OF THE INVENTION

The prior art is already aware of arrangements for park-lock mechanisms which utilize pawls which are movably mounted for engaging the park gear and thus hold the transmission in a non-operative position. In these prior art arrangements, various adaptations and means are employed for moving the pawl into engaged position with the park gear, and also various arrangements and means are utilized for releasing the pawl from the gear so that the transmission can operate. One prior art park-lock mechanism for transmissions is disclosed in U.S. Pat. No. 3,990,541 where a pawl or latch is pivotly mounted and under the influence of a spring for engagement and disengagement with the gear. Beyond the prior art patents cited in the aforesaid patent, other prior art patents are U.S. Pat. Nos. 2,865,227 and 2,875,856 and 3,074,513 and 3,116,815 and 3,300,001 and 3,856,119. These prior art patents generally show pivotally mounted pawls or latches which move into engagement with the park gear so that the transmission cannot be operated and thus the vehicle is retained in a static or parked position.

One of the concerns with respect to the prior art is that there is significant force between the pawl or latch and the park gear itself, since the engaged teeth are forced against each other. Accordingly, it is difficult to retract the pawl or latch from the park gear teeth, and the force between the teeth must be overcome before the retraction can be accomplished. Of course when the vehicle is parked on an irregular surface or on an incline, such that it tends to roll either forward or backward, then the force between the teeth is considerable and it takes special mechanism and force to release the park gear. Further, since the force exists between the engaged teeth under certain conditions, such as those mentioned, then the elements forming the construction must be sturdy and even complex so that the operator can overcome the gear teeth force and release the park gear when desired. A shift mechanism is commonly employed for releasing the pawl or latch, and that is manually operated and thus the operator must force on the lever in a sufficient amount to effect the release.

Still further, in the prior art arrangements, such as those mentioned above, the force between the latch or pawl teeth and the park gear teeth is such that the teeth are subject to being worn and even broken, and thus the expense, reliability, and need for repair are of concern in the prior art constructions.

The present invention came about upon recognizing the aforemention problems, and the present invention overcomes the aforementioned problems and thus provides a park-lock mechanism which is highly reliable, inexpensive, sturdy for the forces and purposes to which it is subjected, and which is easily manufactured and maintained.

Another and important object of this invention is to provide a park-lock mechanism which accomplishes the aforementioned and which does so with a construction which utilizes the force tending to rotate the park gear for actual release of the latch or pawl itself. That is, once only an initial manual movement is made for releasing the latch or pawl, then the force presented by the park gear itself is utilized for further release of the latch or pawl.

Still further, and still with respect to the aforementioned objectives and advantages, the park-lock mechanism of this invention provides a construction which is not subject to excessive wear and likelihood of damage, such as breaking the gear teeth, and this is accomplished by having the latch or pawl itself released in the direction which the park gear itself tends to rotate, to thus avoid wear and danger of breakage.

Therefore, the objects and advantages of this invention include the arrangement of a park-lock mechanism which has effortless park-lock disengagement regardless of direction of load, or amount of load, due to the inherent load assistance of the design itself. Also, there is positive disengagement of the park-lock pawl from the park gear without having to depend on gear tooth angle and over-designed springs to effect this engagement. Further, there is less wear on the parts because the pawl itself moves out of mesh with the park gear instead of being forced or pulled out of engagement. In fact, the park-lock pawl of this invention and the park gear are moving at the same speed and in the same direction during the disengaging process and they continue to do so until they become fully disengaged, and there is thus no excessive wear and in fact only minimal wear.

Other objects and advantages will become apparent upon reading the following description in light of the accompanying drawings.

BRIEF DESCRIPTION OF THE DRAWINGS

FIG. 1 is a side elevational view of a preferred embodiment of this invention.

FIG. 2 is a top plan view of FIG. 1.

DETAILED DESCRIPTION OF THE PREFERRED EMBODIMENT

The drawings show the park-lock mechanism of this invention to include a park gear 10 which would normally be enclosed and disposed within a vehicle transmission, and it includes a pawl 11 which is movably mounted adjacent to gear 10. The gear 10 has gear teeth 12 extending thereround and would of course be a circular gear though only approximately a quarter segment thereof is shown. The pawl 11 has gear teeth 13 which match and mate with the teeth 12 such that when the pawl 11 is held in a fixed or immovable position, then the gear 10 cannot rotate because of the engagement between the teeth 12 and 13.

It will be further noticed that the pawl 11 is an elongated member which is not pivotally mounted but which is free to move in all directions, except for the restraint thereon by the gear 10 and other mechanism described hereinafter.

A control member 14 is movably mounted and includes a rod 16 terminating in a lever 17 which is under the control of the operator, for instance, for the purpose of rotating the control member 14 about its fixed axis 18 which is the longitudinal axis of the rod portion 16 of the control 14. The control 14 has two antifriction members in the form of rollers 19 and 21 which are rotatably mounted as two parts of the control member 14, and they have rotation axes 22 and 23, respectively, and those axes are set or fixed on the control member 14, and thus the rollers 19 and 21 can be moved to the dot-dash positions shown and designated.

Thus, as viewed in FIG. 1, if the control member 14 is rotated counterclockwise, then the rollers 19 and 21 would initially move toward the dot-dash positions shown, and the control member 14 might actually be rotated approximately 90 degrees off the vertical position shown, and that would be to approximately a horizontal position for orientation of the roller axes 22 and 23.

It will be further seen and understood that the pawl 11 has two oppositely faced surfaces 24 and 26 which are shown to be arcuate and even elliptical, and they are in the same plane and face toward each other and are of the same configuration relative to each other.

With the mechanism as described to this point, it will be seen and understood that the operator will manipulate the control member 14, such as through the lever or handle 17, and that can position the rollers 19 and 21 to positions out of initial contact with the respective arcuate surfaces 24 and 26. Therefore, the maximum span between the outer circumferences of the rollers 19 and 21 is substantially the same as the spacing between the surfaces 24 and 26 at the midpoints of those surfaces, such as shown in the full line position for the control member 14 in FIG. 1, that is in the vertical plane as viewed in FIG. 1. Therefore, the control member 14 retains the pawl 11 in the position shown in FIG. 1, and that is the position of engagement with the park gear 10 to restrain rotation of the gear 10, as desired. It will be further observed and mentioned that U.S. Pat. No. 3,990,541 shows some mechanism and other arrangements, for providing a operator controlled lever or control member for positioning a pawl or latch, and the present invention could incorporate some of that arrangement to the extent that the arrangement is not specifically shown in the present disclosure. Specifically, the control member 14 could be arranged with a set position which the operator would be able to achieve for knowing that the mechanism is in the FIG. 1 position, and that mechanism may be the spring latch and detent arrangement such as shown in the aforesaid U.S. patent.

It will be further seen and understood that the pawl 11 is disposed in the plane of the gear 10, such as shown particularly in FIG. 2, and the pawl 11 thus moves in that plane and thus can move in response to the location of the gear 10 when the pawl 11 is released by the control member 14, as described hereinafter.

A roller 27 is mounted on a fixed pin 28 and is shown to be in abuttment with a surface 29 on the pawl 11 in the FIG. 1 position. Thus, when the control member 14 is in the FIG. 1 position the roller 21 is actually forcing downwardly on the surface 26 and thus causes the pawl teeth 13 to engage the gear teeth 12 and it also causes the pawl surface 29 to bear downwardly on the roller 27. As such, the pawl 11 is held in a fixed position for restraining rotation of the park gear 10, as desired. Of course when the control member 14 is rotated, such as to the dot-dash position shown, then the pawl 11 will commence to be released from the gear teeth 12, and such release could be effected by the tension spring 31 which is connected with a fixed support 32, at one end and is connected at its end 33 with the pawl 11. That is, if there is no tendency for the park gear 10 to rotate when the pawl 11 is to be released from the gear 10, then the spring 31 will simply lift the pawl 11 away from the gear 10 and the gear 10 will then be completely free to rotate when the vehicle is to be moved. However, if, upon initial manipulation of the control member 14 for the purpose of releasing the park-lock mechanism, the gear 10 tends to rotate in either direction, it will move the pawl 11 to either the left or right, depending upon the direction and amount of rotation of the gear 10. For instance, if the gear 10 tended to rotate counterclockwise, as viewed in FIG. 1, then the initial movement of the control member 14 from full line position shown and toward the dot-dash line position shown would permit the pawl 11 to move to the left, as viewed in FIG. 1. In fact, the pawl 11 would move to the left a sufficient amount to where the pawl teeth 13 can be readily removed from the gear teeth 12, such as by complete displacement of pawl 11 through the gear 10 or by the sufficient release of the force between the teeth 12 and 13 and the tension in the spring 31.

An important feature is the fact that when the control member 14 is moved slightly out of the vertical position shown by solid lines in FIG. 1, if the park gear 10 is tending to rotate in either direction, then the pawl 11 will be displaced either to the left or right and will actually have its surfaces 24 and 26 force upon the respective rollers 19 and 21 to assist in the manipulation and actual rotation of the control member 14. Accordingly, the release does not require a large force to be exerted by the operator, nor does it place the parts under strain and undue wear. Of course the pawl surface 29 will simply roll off the roller 27 when it is moved to the left or right, and it will also re-position itself in the position of FIG. 1, such as by virtue of the ramp surfaces 34, when the pawl 11 is moved back to the position of alignment, such as achieved by the tension and force in the spring 31 when the pawl 11 is free from the gear 10 and the control member 14.

It will be further seen and understood that the pawl 11 has two slots 36 and 37 which open onto the center-open portion 38 in the pawl 11 as defined by the surfaces 24 and 26. Of course the control member rollers 19 and 21 are disposed within that pawl opening 38, and they are of a size which permits them to enter the slots 36 and 37 if and when the pawl 11 is displaced a sufficient amount to the left or right in the manner described above. Therefore, when the pawl 11 is thus shifted to the left or right as described, then the rollers 19 and 21 disposed within either of the slots 36 or 37 will retain the pawl 11 in the inoperative position, and the spring 31 will position the pawl 11 so that the control member 14 can again be rotated from the inoperative position to have one of the rollers 19 or 21 engage its respective surface 24 and 26 adjacent the slots 36 or 37 and thus again manipulate the pawl 11 to the engaged or downward position shown in FIG. 1, when desired. That is, the pawl 11 need not shift to a distance where actually both of the rollers 19 and 21 are fully and exclusively disposed in the respective slots 36 or 37, but one of the rollers can be at the juncture between the arcuate surfaces and the slots so that the projecting one roller 19 or 21 can be engaged with the arcuate surface upon manipulation of the control member 14 to thus swing the pawl 11 back to the aligned position and be available for re-engagement with the gear 10. Therefore, the spring 31 will generally return the pawl 11 to its ready or aligned position to thus move the pawl so that the rollers 19 and 21 are out of the slots 36 or 37, but the manipulation of the control member 14 will also assist in that release, if desired or needed.

As such, there is provided a park-lock mechanism which does not have a pivotly mounted pawl but the pawl is free to move in any direction when it is released, and the tendency for the park gear to rotate will actually be utilized to advantage in achieving the release so that the force of release is only a minimal amount required, as explained above. Further, the control member 14, through the rollers 19 and 21, present cams or cam followers, and the surfaces 24 and 26 are thus in the nature of cam surfaces, and therefore the mechanical advantage of that arrangement is achieved, as described. Of course the rollers 19 and 21 will be rotatably supported as portions of the control member 14, such as through the center support or spider 38 affixed with the rod 16 for rotation therewith and carrying pins 39 for rotatably mounting the respective rollers. As such, the pawl 11 is movable in a first direction relative to the gear 10, and that is radial to the gear 10 and thus directly into and out of engagement with the gear teeth 12, and the pawl 11 is also movable in a second direction which is oblique to the first direction, and that direction is generally along the length of the pawl 11 and that is basically horizontal as viewed in FIG. 1. Also, the rotation of the gear 10, if there be any in the lock mode, will induce the pawl to move in the aforesaid second direction, and if the gear 10 rotates clockwise, as viewed in FIG. 1, the pawl 11 will also be able to move to the right or second direction and the pawl 11 could even ride over the gear teeth 12 on the undersurface of the pawl 11, if necessary, and in that event, and still all the objectives and advantages of this invention are accomplished.

What is claimed is:

1. A park-lock mechanism for a vehicle transmission, comprising a rotatably mounted transmission gear having teeth thereon, a pawl movably mounted for movement in a first direction toward said gear to engage said gear teeth and restrain said gear against rotation and for movement in a second direction oblique to said first direction and away from said gear, a manipulable control member in contact with said pawl for moving said pawl in said first direction to releasably position said pawl in restraining position on said gear teeth, said control member being free of positioning said pawl when said control member is manipulated and thereby said pawl is free to move in said second direction and away from said gear under the influence of rotation of said gear, and a tension spring attached to said pawl for urging said pawl into a position of alignment with said gear for said control member to move said pawl into the restraining position.

2. The park-lock mechanism for a vehicle transmission as claimed in claim 1, wherein said pawl is mounted free of a fixed pivot axis and with said first direction movement being radial of said gear and with said second direction movement being tangential of said gear.

3. The park-lock mechanism for a vehicle transmission as claimed in claims 1 or 2, wherein said control member includes anti-friction members, and said pawl includes two oppositely faced surfaces in contact with said anti-friction members for inducing the movements of said pawl.

4. The park-lock mechanism for a vehicle transmission as claimed in claim 3, wherein said surfaces are arcuately shaped and present cam follower surfaces to said anti-friction members upon manipulation of said control member.

5. The park-lock mechanism for a vehicle transmission as claimed in claim 4, wherein said pawl has a slot interposed between said arcuate surfaces and being of a size larger than said anti-friction members for receiving said anti-friction members when said pawl is moved in said second direction.

6. The park-lock mechanism for a vehicle transmission as claimed in claim 1, wherein said pawl and said control member are arranged in contact with a cam and cam follower relationship, and with said pawl arranged to receive the force of rotation from said gear in said second direction of movement of said pawl and thereby transmit the force of movement of said pawl to said control member and thus assist in the manipulation of said control member.

7. The park-lock mechanism for a vehicle transmission as claimed in claim 6, wherein said control member includes anti-friction members, and said pawl includes two oppositely faced surfaces in contact with said anti-friction members for inducing the movements of said pawl.

8. The park-lock mechanism for a vehicle transmission as claimed in claims 1 or 7, including a stationary guide surface adjacent said pawl and in sliding contact with said pawl and spaced along said pawl from the location of said control member to present a lever type of support with said control member and for said pawl.

9. The park-lock mechanism for a vehicle transmission as claimed in claim 1, including a stationary guide surface adjacent said pawl and in sliding contact with said pawl and spaced along said pawl from the location of said control member to present a lever type of support with said control member and for said pawl.

10. The park-lock mechanism for a vehicle transmission as claimed in claim 9, wherein said control member includes anti-friction members, and said pawl includes two oppositely faced surfaces in contact with said anti-friction members for inducing the movements of said pawl.

11. The park-lock mechanism for a vehicle transmission as claimed in claim 10, wherein said surfaces are arcuately shaped and present cam follower surfaces to said anti-friction members upon manipulation of said control member.

* * * * *